(12) United States Patent
Marlin et al.

(10) Patent No.: US 9,470,250 B2
(45) Date of Patent: Oct. 18, 2016

(54) TRIGGERED-STROKE ACTUATOR FITTED WITH A GAS EVACUATION DEVICE

(75) Inventors: Frédéric Marlin, Saint Medard en Jalles (FR); Jean-Paul Nadeau, Saint Medard en Jalles (FR)

(73) Assignee: HERAKLES, Le Haillan (FR)

( * ) Notice: Subject to any disclaimer, the term of this patent is extended or adjusted under 35 U.S.C. 154(b) by 720 days.

(21) Appl. No.: 13/704,488

(22) PCT Filed: Jun. 14, 2011

(86) PCT No.: PCT/FR2011/051344
§ 371 (c)(1),
(2), (4) Date: Feb. 12, 2013

(87) PCT Pub. No.: WO2011/157940
PCT Pub. Date: Dec. 22, 2011

(65) Prior Publication Data
US 2013/0139508 A1    Jun. 6, 2013

(30) Foreign Application Priority Data

Jun. 15, 2010   (FR) ...................................... 10 54712
Feb. 17, 2011   (FR) ...................................... 11 51321

(51) Int. Cl.
*F15B 15/22*   (2006.01)
*F15B 15/19*   (2006.01)
*F15B 11/15*   (2006.01)
(Continued)

(52) U.S. Cl.
CPC ............... *F15B 15/19* (2013.01); *B60R 21/38* (2013.01); *F15B 15/1452* (2013.01)

(58) Field of Classification Search
CPC .... F15B 15/19; F15B 15/22; F15B 15/1452; B60R 21/38

USPC ......... 92/181 P, 182, 185, 85 A, 85 B, 85 R; 60/632–328
See application file for complete search history.

(56) References Cited

U.S. PATENT DOCUMENTS 3,224,378 A  * 12/1965  Graham .................... 417/511
3,364,675 A  *  1/1968  Dorer ..................... F02G 1/05
                                                    123/22
(Continued)

FOREIGN PATENT DOCUMENTS

DE       102011106514 A1  * 12/2012
EP         0550321           7/1993
(Continued)

OTHER PUBLICATIONS

WO 2009122080 A2 English Translation.*

*Primary Examiner* — Thomas Denion
*Assistant Examiner* — Jessica Kebea
(74) *Attorney, Agent, or Firm* — Hamre, Schumann, Mueller & Larson, P.C.

(57) ABSTRACT

The invention relates to a triggered-stroke actuator (10) comprising a body (12) housing a piston (14) and a rod (16), and a gas generator (18) mounted in said body (12) opposite said piston (14) and capable of pressurising a first chamber (20) defined between said gas generator and said piston, in which the piston (14) comprises, on its external face, a groove (30) in which is housed a sealing joint (40) with the body (12) of the actuator (10). A calibrated passage (50), adapted to evacuate gas from the first chamber (20), is formed between the sealing joint (40) and the wall of the groove (30).

16 Claims, 6 Drawing Sheets (51) Int. Cl.
  *F15B 15/14*       (2006.01)
  *B60R 21/38*       (2011.01)

(56) References Cited

U.S. PATENT DOCUMENTS

| | | | | |
|---|---|---|---|---|
| 3,484,846 | A * | 12/1969 | Schimmel et al. | 60/637 |
| 3,891,271 | A * | 6/1975 | Fieni | 297/470 |
| 4,041,924 | A * | 8/1977 | Grosseau | F16J 9/00 123/193.4 |
| 4,901,828 | A * | 2/1990 | Schmidt | F16F 9/48 16/51 |
| 5,016,524 | A * | 5/1991 | Kawai et al. | 92/182 |
| 5,303,631 | A | 4/1994 | Frehaut et al. | |
| 6,572,147 | B2 * | 6/2003 | Webber et al. | 280/806 |
| 6,671,966 | B2 * | 1/2004 | Lewis | 30/228 |
| 6,942,261 | B2 * | 9/2005 | Larsen et al. | 293/107 |
| 7,325,622 | B2 * | 2/2008 | Sjostrom | 169/73 |
| 7,913,795 | B2 | 3/2011 | Borg et al. | |
| 8,549,975 | B2 * | 10/2013 | Schafer et al. | 89/1.14 |
| 8,635,872 | B2 * | 1/2014 | Mayer et al. | 60/632 |
| 8,757,046 | B2 * | 6/2014 | Brettes et al. | 92/182 |
| 2010/0314838 | A1 * | 12/2010 | Slack | 277/520 |
| 2011/0011256 | A1 | 1/2011 | Borg et al. | |
| 2012/0011847 | A1 * | 1/2012 | Borg et al. | 60/632 |
| 2013/0113165 | A1 * | 5/2013 | Sueyoshi et al. | 277/449 |

FOREIGN PATENT DOCUMENTS

| | | | | |
|---|---|---|---|---|
| FR | 2878212 | | 5/2006 | |
| FR | 2928980 | | 9/2009 | |
| FR | WO 2009122080 | A2 * | 10/2009 | B60R 21/38 |
| GB | 2432407 | A * | 5/2007 | |
| JP | 2000033850 | A * | 2/2000 | |
| WO | WO 2009156666 | A2 * | 12/2009 | F15B 15/22 |

* cited by examiner

TRIGGERED-STROKE ACTUATOR FITTED WITH A GAS EVACUATION DEVICE

The invention relates to a triggered-stroke actuator.

A triggered-stroke actuator according to the present invention is adapted particularly to a security system intended to equip a vehicle and the function of which is to rapidly lift the bonnet of the vehicle in case of collision with a pedestrian.

Patent FR 2 878 212 describes a security system for protection of a pedestrian when the latter is struck by a vehicle. This system comprises a mechanism for rapidly lifting the bonnet of the vehicle in case of collision. In fact, when such a collision occurs, the head of the pedestrian frequently strikes the bonnet of the vehicle. This shock of the head on the bonnet causes deformations of the bonnet. Beyond certain deformation, the bonnet makes contact with the engine block and all the rigid pieces which surround the engine. At this moment the head of the pedestrian undergoes the strongest deceleration, capable of causing serious injury. The system mentioned previously is therefore designed to rapidly lift the bonnet by a certain height, so as to prevent the pedestrian and especially his head from striking the engine block after deformation of the bonnet. The raising of the bonnet is done at the level of the rear of the latter, to the side of the windscreen. The bonnet remains attached to the front of the vehicle.

Such a security system, if actuated in time by appropriate detection means, lifts the bonnet by a few tens of millimetres in a few tens of milliseconds (100 mm and 30 milliseconds are usual values), that is, within a very short time interval after detection of imminent shock. The engine element of such a system advantageously comprises a triggered-stroke actuator of the type comprising a pyrotechnic charge, ignited electrically. The gas generated by the combustion of the charge repels the piston of the actuator itself linked to a rod actuating the lifting mechanism of the bonnet.

In case of no shock, it must be possible to reposition the bonnet into its initial position, under its own weight or with moderate effort, at the end of a certain period after triggering.

In the end and after operation, the gas having caused the displacement of the piston keeps a certain pressure in the gas expansion chamber of the actuator. This pressure grows significantly if the actuator is to be returned to its initial position, for example by closing the bonnet in the case of a pedestrian-protection system. To avoid recompression in the gas expansion chamber, a calibrated leak must be made so as to evacuate the gas which has caused displacement of the piston.

Patent application EP 0 550 321 is known which describes a pyrotechnic actuator equipped with means of passage for gas having caused displacement of the piston. More particularly, the actuator comprises a combustion chamber communicating with an intermediate compression chamber, as well as a counter-pressure chamber separated from said intermediate compression chamber by a piston. The displacement speed of the piston is controlled by partial evacuation of gas from the intermediate compression chamber to the counter-pressure chamber. According to a first variant, evacuation is completed via an external conduit which connects the intermediate compression chamber to the counter-pressure chamber. This external conduit complicates assembly of the actuator and increases its bulk. According to a second variant, evacuation of gas is completed via a simple slot made in the internal wall of the body, said slot ensuring passage for gas from one chamber to the other. Machining such a slot is a complex operation the reproducibility of which is not assured. In addition, irrespective of the means of passage provided for the gas contained in the intermediate compression chamber, no system is provided for the return of the piston to its initial position after triggering.

Document FR 2 928 980 also discloses a triggered-stroke actuator of the type comprising a separate body housing a piston and a rod, means for propelling the piston in response to a triggering command and a return braking arrangement, in which the piston is traversed from side to side by a leakage port arranged according to its axis. Such a leakage port is difficult and costly to implement and can be used only when the rod of the piston is dissociated from the latter, as in the example of the above document.

The aim of the invention therefore is to provide a triggered-stroke actuator comprising a piston and a rod and a gas generator intended to propel said piston in response to a triggering command, and fitted with a simple mechanism for total or partial evacuation of gas contained in the gas expansion chamber to enable the piston and the rod of this actuator to resume a rear return position under their own weight or with moderate effort, after triggering.

This aim is attained by means of a triggered-stroke actuator comprising a body housing a piston and a rod, and a gas generator mounted in said body opposite said piston and capable of pressurising a first chamber defined between said gas generator and said piston, in which the piston comprises on its external face a groove in which is housed a sealing joint with said body, characterised in that a calibrated passage adapted to evacuate gas from said first chamber is formed between the sealing joint and the wall of said groove.

During and after operation of the actuator, the calibrated passage forms a leakage port for gas contained in the first chamber (or gas expansion chamber) of the actuator. The actuator according to the invention therefore enables the piston and the rod of the actuator to resume a rear return position. For example, if the rod is linked to a mechanism for lifting the bonnet of an automobile in case of frontal shock with a pedestrian, the actuator according to the invention enables the rod to resume a rear return position in case of no shock and repositioning of the bonnet in its initial position, under its own weight or with moderate effort.

In addition, as the calibrated passage is formed between the sealing joint and the wall or the walls of the groove, it can be put in place or formed very easily during assembly or fabrication.

Throughout the present application, the groove is defined as the cavity housing the joint intended to ensure the sealing between the piston and the body of the actuator. It can be delimited by one or more walls of the piston and/or by elements attached to one or more walls of the piston.

According to an aspect of the invention, the calibrated passage comprises at least one slot formed in a wall of the groove. In this case, the invention relates to a triggered-stroke actuator comprising a body housing a piston and a rod, and a gas generator mounted in said body opposite said piston and capable of pressurising a first chamber defined between said gas generator and said piston, in which the piston comprises on its external face a groove in which a sealing joint with said body is housed, and characterised in that the piston comprises at least one slot formed in said groove and configured to form a calibrated passage for evacuation of gas from said first chamber.

According to an embodiment, a slot is formed directly in the piston. Such a slot is very easy and inexpensive to produce. It is easily reproducible, needs no extra pieces, and involves no particular assembly.

According to another embodiment, at least one wall part of the groove is formed by a split ring. In this case, the slit of the split ring forms a slot, which in the same way creates a passage for gas originating from the first chamber of the actuator between the wall of the groove and the sealing joint.

It is to be noted that, as is known, the first chamber of the actuator (or gas expansion chamber) can be subdivided into several intermediate chambers by means of open separation walls.

According to an embodiment, the groove has a bottom and two lateral walls extending respectively from an inlet of the groove to the bottom and from the bottom to an outlet of the groove, and the slot comprises a segment formed in the bottom of the groove. This configuration permits circulation of gas from the first chamber of the actuator, by forming a passage between the sealing joint and the bottom of the groove. The gas can bypass locally the sealing joint at a low flow rate.

According to another example, the slot also comprises a segment formed on at least one of the lateral walls of said groove. In the case where the groove is delimited at least in part by a split ring, said ring can for example present a transversal section of general L-shape. This arrangement facilitates the passage of gas from the first chamber of the actuator, especially when the compression rate of the sealing joint inside the groove is relatively high.

It is to be noted that the segments of the slot can be made in the walls of the groove without necessarily being joined.

According to another example, the slot extends continuously over the entire internal contour of the groove. This configuration permits the passage of gas from the first chamber of the actuator, even in the case where the pressure in the expansion chamber is not very high and where the compression rate of the joint in the groove of the piston is very high. In the case where the groove is delimited at least in part by a split ring, said ring can for example present a transversal U-section.

According to a second aspect of the invention, the groove locally comprises at least one protruding part, near which the joint moves away from the wall of the groove. In this way, the calibrated passage for the gas is defined, on both sides of said protrusion, between the joint and the wall adjacent to the groove.

In the present invention, protruding part means any part in relief relative to a generally plane or revolving portion of wall of the groove, which can be formed for example by the piston itself, for example by a slot in the bottom of the groove and/or on one of its lateral walls, or by any element attached inside the groove.

According to a particularly simple example for implementation, the protruding part is formed by an attached element in the groove, for example a metal strip.

This attached element preferably comprises at least one adhesive portion by which it can adhere to a wall of the groove. These arrangements hold the attached element in place inside the groove and ensure its efficacy over time.

According to another embodiment, a second chamber which at least partially houses the rod of the actuator is defined by the internal surface of the actuator body to the side of the piston opposite the first chamber (or gas expansion chamber). In this case, the calibrated passage is configured to let the gas escape between the first chamber and this second chamber of the actuator.

According to an example, the second chamber of the actuator is open to the exterior, prior to triggering.

According to another example, the second chamber is closed to the exterior, prior to triggering, and opens during operation of the actuator.

In particular, the second chamber of the actuator can be insulated from the exterior by blocking means (e.g., a sealing element) in contact with the internal surface of the actuator body and borne by the rod such that during operation of the actuator it is moved into a position in which the second chamber is open to the exterior. According to an embodiment, the blocking means are solid with the rod and positioned relative to the latter such that during operation of the actuator the blocking means are moved out of said body, by which the second chamber is open to the exterior.

When the second chamber is closed to the external space prior to triggering, there can be no corrosion throughout period in which the actuator has not been triggered. The gas generator (and, in the case of a pyrotechnic gas generator, pyrotechnic charges) is sheltered from the exterior. The internal metal elements of the actuator can be made of inexpensive metals without need for special anticorrosion treatment. When the second chamber is open to the external space, after operation, the passage of gas from the first chamber to the exterior allows depressurisation of said first chamber after some time (long relative to that of the actuator operation), and therefore the quasi effortless return of the actuator to its initial position.

Several modes or embodiments are described in the present disclosure. However, unless specified otherwise, the characteristics described in connection with any mode or embodiment can be applied to another mode or embodiment.

Other characteristics and advantages of the invention will emerge from the following description of embodiments of the invention given by way of illustration and non-limiting. This description makes reference to the pages of attached drawings, in which.

Figure 1A:
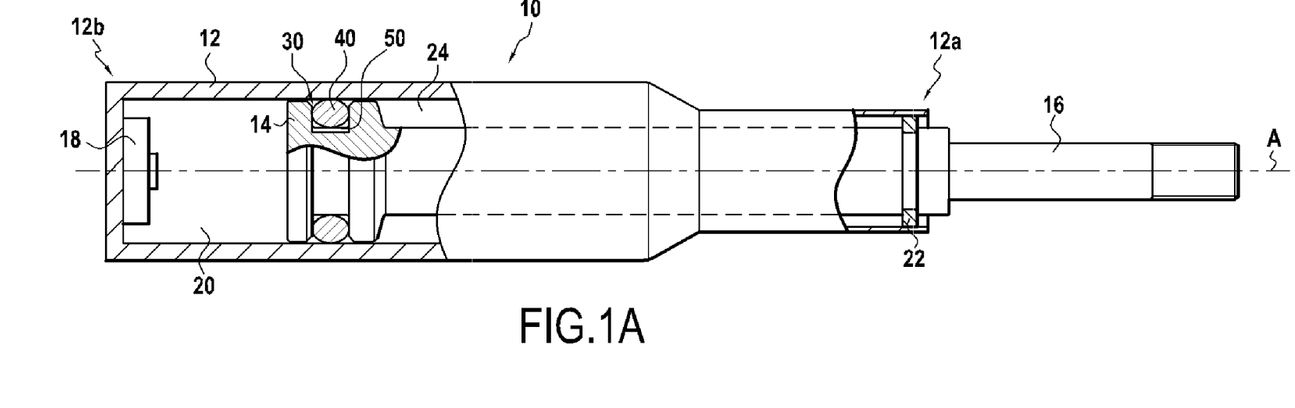
FIG. 1A shows a view partially in axial section of an actuator according to a first embodiment of the present invention, prior to triggering.

The triggered-stroke actuator 10 such as illustrated in FIG. 1A comprises a body 12, generally cylindrical and having an axis A, housing a piston 14 linked to a rod 16 protruding axially to an end 12a of the body 12. The latter also houses means for propelling the piston 14 in response to a triggering command. In the example shown, these means are constituted by a pyrotechnic gas generator 18 mounted in the body 12 opposite the piston 14. The gas generator 18 is crimped onto the end of the body 12b which is opposite that 12a where the rod 16 protrudes axially. A first chamber of the actuator or gas expansion chamber 20 is arranged between the gas generator 18 and the end opposite the piston 14.

In the present application, unless specified otherwise, a radial direction is a direction perpendicular to the axis A of the actuator 10 and cutting this axis A. Also, an axial direction is a direction parallel to the axis A of the actuator 10. The adjectives axial and radial are used in reference to the aforementioned axial and radial directions. Similarly, an axial plane is a plane containing the axis A of the actuator and a radial plane is a plane perpendicular to this axis. In addition, in the present application, upstream and downstream are defined relative to the direction of displacement of the piston 14 and of the rod 16 through the body 12 of the actuator 10 (from upstream to downstream).

As mentioned hereinabove, the rod 16 can be linked to a mechanism (not shown) for lifting the bonnet of an automobile in case of frontal shock with a pedestrian.

As shown in FIG. 1, a sealing element 22, solid with the rod 16, is arranged at the end 12*a* of the body 12 where the rod 16 protrudes to the exterior. A second chamber 24 of the actuator 10, housing a portion of the rod 16, is defined between the end of the piston 14 opposite the rod 16 and the sealing element 22.

Figure 2:
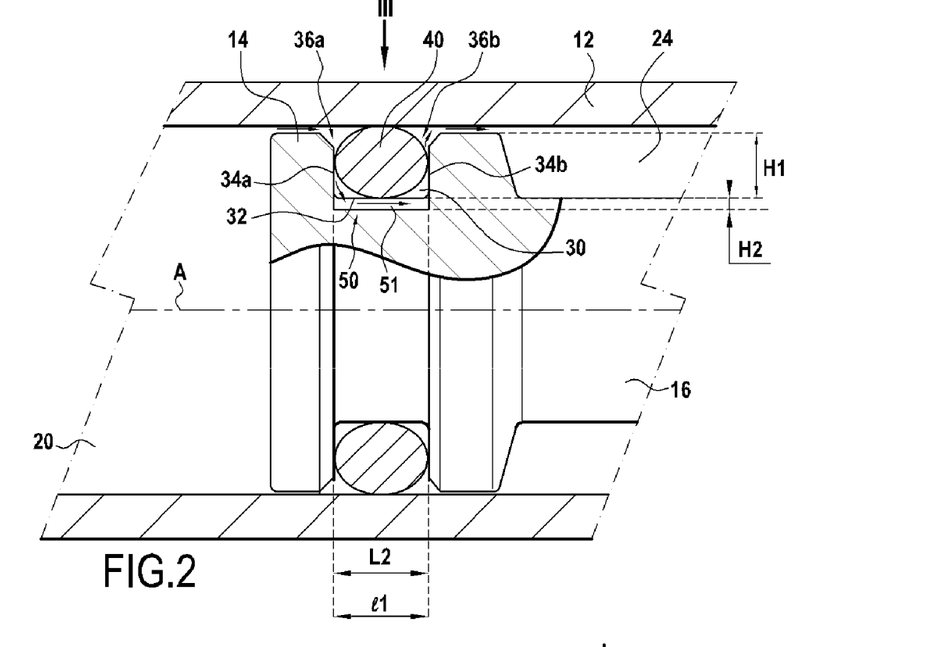
FIG. 2 is a partial view, in axial section according to II of FIG. 4, of the actuator of FIG. 1A.
Figure 3:
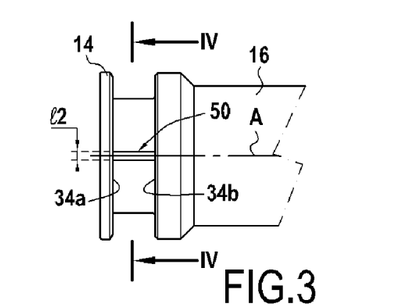
FIG. 3 is an elevation of the piston of FIG. 2, according to III.

At its periphery, the piston 14 comprises an annular groove 30 in which a sealing O-ring 40 is housed. In the example, the annular groove 30 has a substantially rectangular section in an axial plane. As illustrated in FIG. 2, it comprises a bottom 32, a lateral upstream wall 34*a* defined in a radial plane and extending from an inlet 36*a* of the groove 30 (upstream) to the bottom 32, and a downstream lateral wall 34*b* also defined in a radial plane and extending from the bottom 32 as far as the outlet 36*b* of the groove 30 (downstream). The width 11 of the groove 30 is defined as corresponding to the distance separating its upstream and downstream lateral walls 34*a*, 34*b*, and its depth H1, measured from the external face of the piston 14 to the bottom 32.

The compression of the joint 40 in the radial direction, between the bottom 32 of the groove 30 and the internal face of the actuator body 12 ensures sealing between the piston 14 and the body of the actuator 12.

As illustrated in greater detail in FIG. 2, which illustrates a first embodiment of the invention, a slot 50 is made in the bottom 32 of the groove 30. In the example illustrated, the slot 50 comprises a single segment 51 which extends over the entire width I1 of the groove 30.

The slot 50 can have a wide variety of shapes. It is defined by its length L2, its width I2 and its depth H2, which are dimensioned such that the compression rate of the joint is modified locally only.

Figure 4:
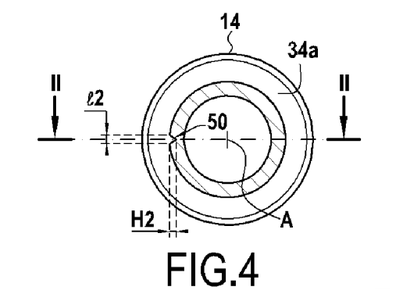
FIG. 4 is a view in radial section according to Iv-Iv of FIG. 3.
Figure 5:
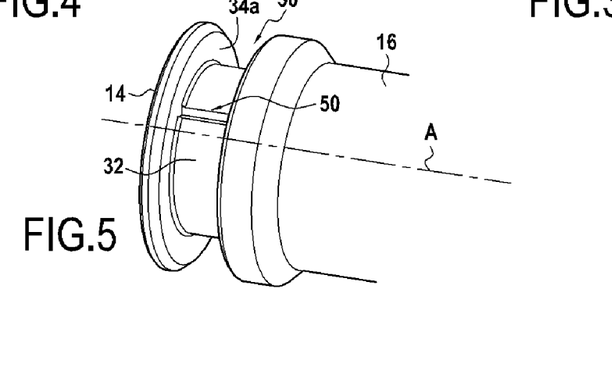
FIG. 5 is a perspective view of the piston of FIGS. 2 to 4, showing the slot.

The slot 50 can for example be obtained by punching. It is made by applying a tool with a given force to the bottom 32 of the groove 30. The form of the slot 50 depends in this case on the geometry of the tool and the force applied. In the example illustrated, the slot 50 has a transversal V-shaped section (i.e. taken in a radial plane), as illustrated in detail in FIG. 4.

The slot 50 can also be produced by machining, especially by milling or knurling.

In the example, the slot 50 is overall defined in an axial plane. According to other variant embodiments, the slot 50 could be arranged differently in the groove 30.

The operation of the actuator 10 will now be described in more detail in reference to FIGS. 1A and 1B.

In the example of FIG. 2, the compression rate of the joint 40 inside the groove 30 is such that the sealing is not perfectly ensured between the joint 40 and the lateral walls 34*a*, 34*b* of the groove 30. In the case where the pressure inside the gas expansion chamber 20 is sufficient, gas can therefore circulate (as indicated by arrows of FIG. 2) between the upstream lateral wall 34*a* of the groove 30 and the sealing joint 40, and between the sealing joint 40 and the downstream lateral wall 34*b* of the groove 30. The slot 50 lets the gas originating from the gas expansion chamber 20 to bypass the sealing joint 40 in the bottom of the groove 30.

The slot 50 can have very different shapes and dimensions according to the preferred leak rate, the dimensions and the form of the sealing joint 40, its compression rate and its hardness. In general, the form of the slot 50, its length L2 and its width 12 are selected as a function of the dimensions and the hardness of the sealing joint 40, to allow passage for gas from the gas expansion chamber 20 to the second chamber 24. The depth H2 of the slot 50 is selected according to the preferred leak rate.

Prior to triggering of the actuator 10, the first and the second chamber 20, 24 are insulated from the exterior by the sealing element 22. Consequently, even if the slot 50 forms a passage between the two chambers 20, 24 of the actuator 10, the actuator 10 is protected vis-a-vis the exterior, especially against corrosion. The pyrotechnic charges of the gas generator 18 are preserved.

When the actuator 10 is actuated in response to a triggering command (for example collision sensors), the rise in pressure in the gas expansion chamber 20 causes displacement of the piston 14 and of the rod 16, and accordingly lifting of the bonnet of the vehicle. The dimensions of the slot 50 are such that the flow rate of gas passing from the gas expansion chamber 20 (to the left of the piston in FIG. 1A) to the second chamber 24 of the actuator 10 (to the right of the piston in FIG. 1A), passing through the slot 50, is weak or even very weak relative to that of the gas generator 18. Consequently, the gas produced by the gas generator 18 efficaciously increases the pressure in the gas expansion chamber 20 and ensures operation of the actuator 10 while escaping at a low rate into said second chamber 24 during and after the operation of the actuator 10.

Figure 1B:
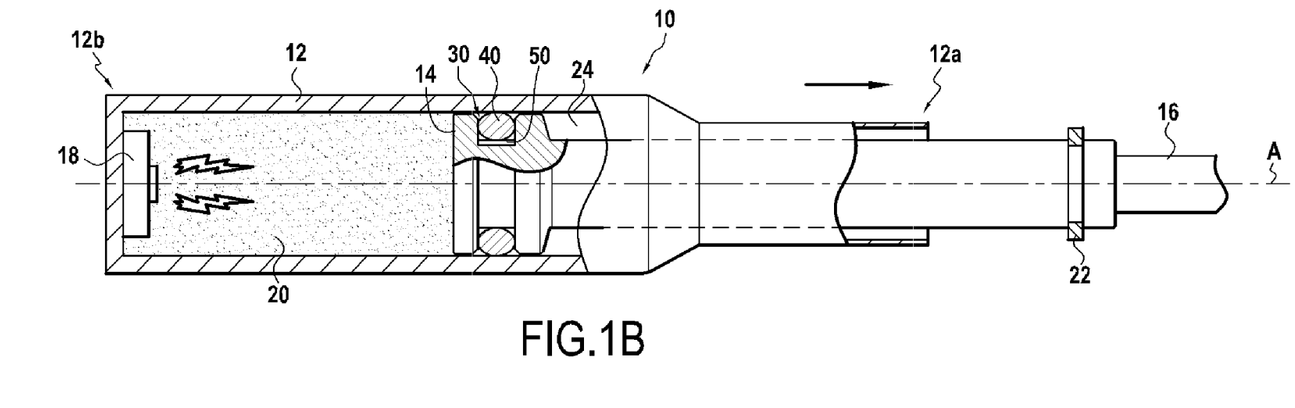
FIG. 1B shows the actuator of FIG. 1A, after triggering.

As shown by FIG. 1B, the sealing element 22, which is solid with the rod 16 and initially positioned at the end 12*a* of the actuator body 12, exits from the actuator body 12 under the effect of displacement of the rod 16. The second chamber 24 of the actuator 10 is now open to the exterior.

When the actuator has been triggered in error for example (absence of shock) and must return to its initial position under the effect of the own weight of the bonnet of the vehicle or of a moderate effort applied by the user, the slot 50 constitutes a leakage port for evacuation to the exterior of gas having caused displacement of the piston 14 (due to expulsion of the sealing element 22, see FIG. 1B).

According to another embodiment (not shown), the second chamber 24 of the actuator 10 can be open to the exterior prior to triggering of the actuator 10. The second chamber 24 is defined to the side of the piston 14 opposite the gas expansion chamber 20, between the internal surface of the actuator body 12 and the rod 16. In this case, the sealing of the actuator 10 is not however ensured.

Figure 6:
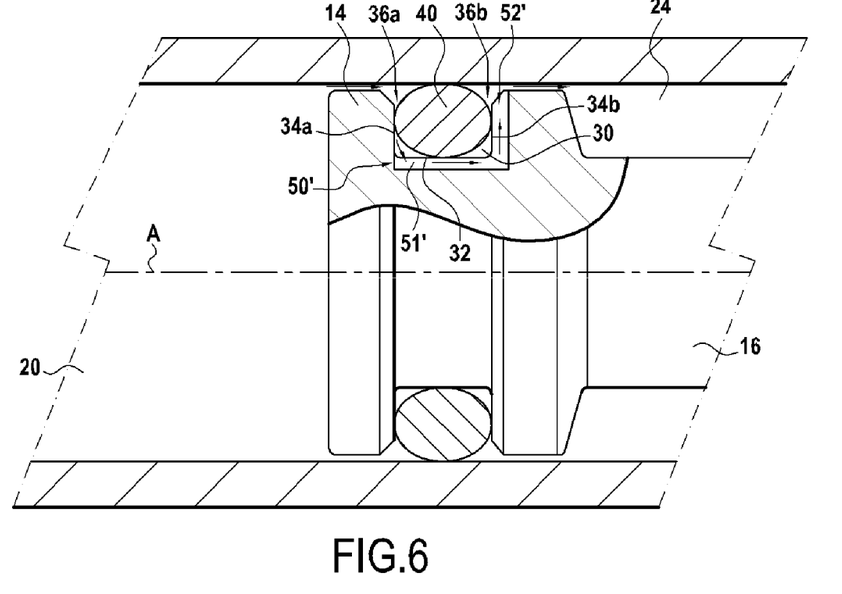
FIGS. 6 and 7 illustrate a first variant of the first embodiment of the invention.
Figure 7:
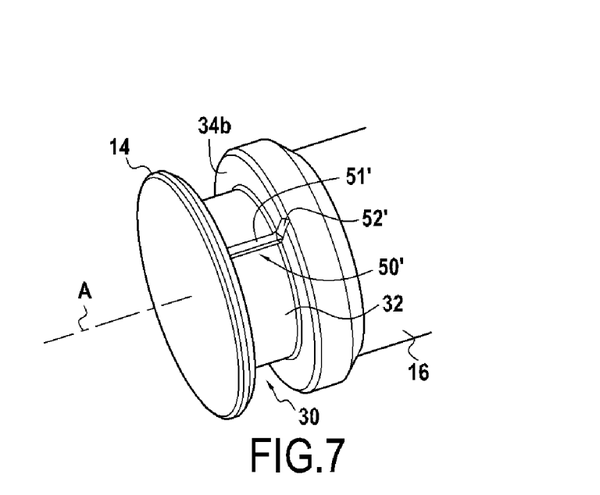

FIGS. 6 and 7 illustrate a first variant of the first embodiment of the invention. The reference signs corresponding to elements common to those of FIGS. 1 to 5 remain identical for the rest of the description.

According to this variant, the slot 50', which comprises a first segment at the bottom of the groove 30, is also prolonged on one of the lateral walls of said groove 30.

In the example illustrated, the slot 50' is constituted by a first segment 51' formed in the bottom 32 of the groove 30 and extending over the entire width of the groove, and a second segment 52' formed in the downstream lateral wall 34b of the groove 30, and extending from said first segment 51' as far as the outlet 36b of the groove 30. In the example, the slot 50' is overall defined in an axial plane.

According to another example (not shown), the slot 50', which comprises a first segment at the bottom of the groove, is prolonged, no longer on the downstream lateral wall 34b but on the upstream lateral wall 34a of the groove 30. The slot 50' for example comprises a first segment 51' formed in the bottom 32 of the groove 30 and extending over the entire width of the groove, and a second segment formed in the upstream lateral wall 34a of the groove 30 and extending from said first segment 51' to the inlet 36a of the groove 30.

Figure 8:
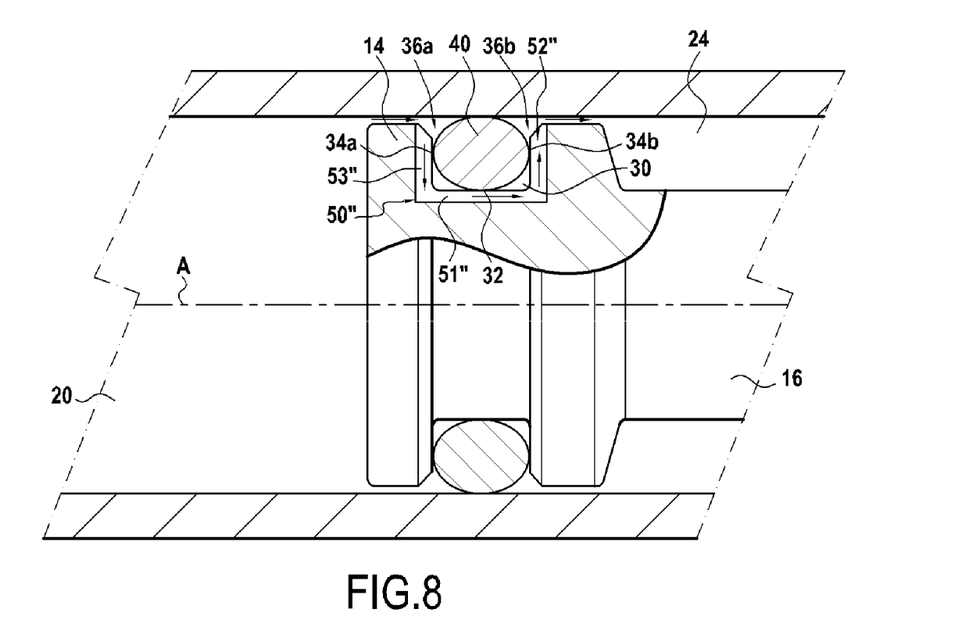
FIGS. 8 and 9 illustrate a second variant of the first embodiment of the invention.
Figure 9:
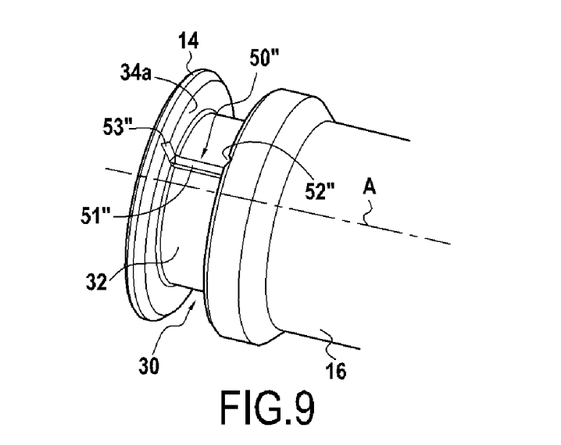

FIGS. 8 and 9 illustrate a second variant of the first embodiment of the invention. The reference signs corresponding to elements common to those of FIGS. 1 to 5 remain identical for the rest of the description.

According to this variant, the slot 50" comprises a first segment 53" formed in the upstream lateral wall 34a of the groove 30, a second segment 51" formed in the bottom 32 of the groove 30, and a third segment 52" formed in the downstream lateral wall 34b of the groove 30. In the example, the slot 50" extends over the entire contour of the groove 30 of the piston 14, that is, according to a "U-shaped" configuration such as illustrated in FIG. 8. In other terms, the first segment 53" extends from the inlet 36a of the groove to the bottom of the groove 32, the second segment 51", which prolongs the first segment 53", extends over the entire width of the groove 30, and the third segment 52", which prolongs the second segment 51', extends from the bottom 32 of the groove 30 to the outlet 36b of the groove 30.

Figure 10:
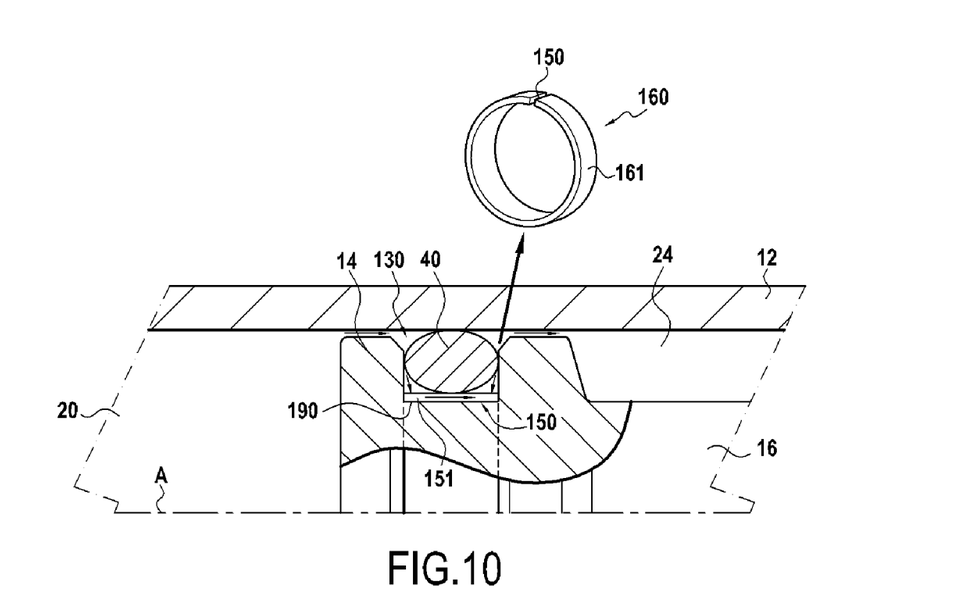
FIGS. 10 to 12 illustrate different variants of a second embodiment of the invention.
Figure 11:
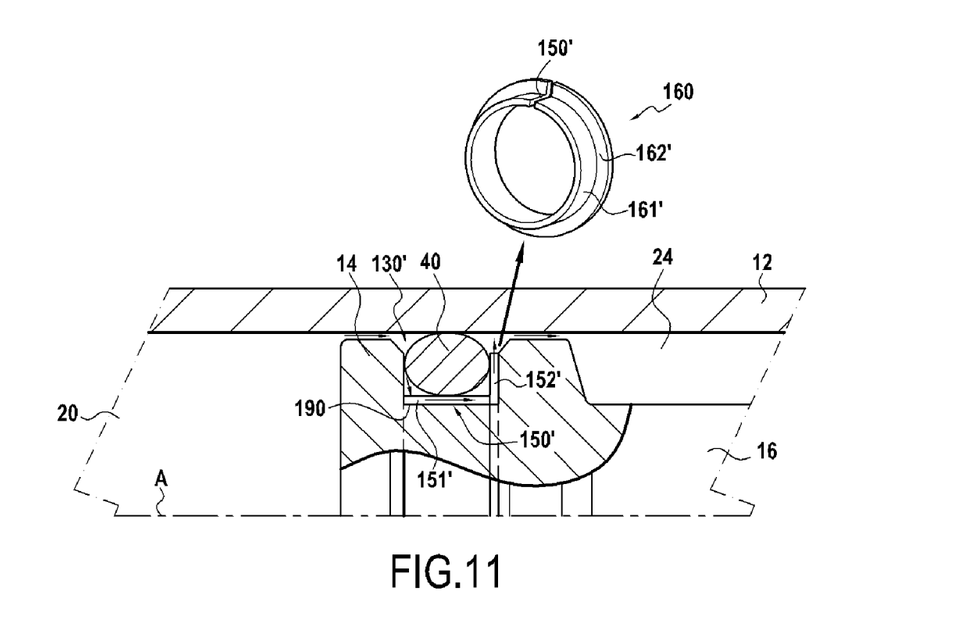
Figure 12:
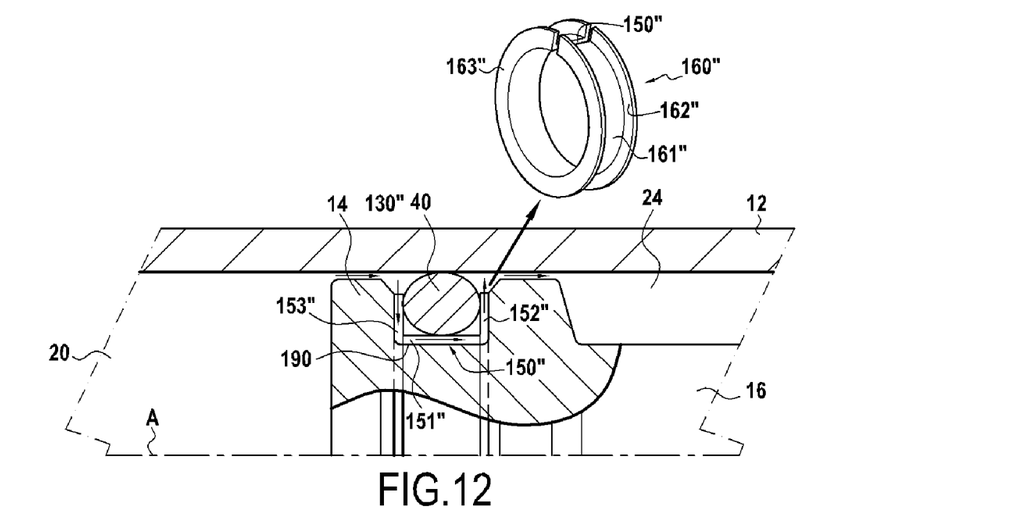

FIGS. 10 to 12 illustrate a second embodiment of the invention. The reference signs corresponding to elements common to those of FIGS. 1 to 9 remain identical for the rest of the description.

In this second embodiment, as illustrated in FIG. 10, a ring 160 (for example a metal ring) having a slit 150 is mounted in a peripheral cavity 190 of the piston 14.

A groove 130, intended to house the sealing joint 40, is delimited both by the piston 14 and by the ring 160.

More precisely, the bottom of the groove 130 is formed by the cylindrical portion 161 of the split ring 160 and its two lateral walls, by the two faces opposite the peripheral cavity 190 of the piston 14.

In the bottom of the groove 130, the slit 150 of the ring 160 forms a slot which fulfils the same function as that 50, described previously in connection with FIGS. 1 to 5.

In this second embodiment, the depth of the slot 150 is a function of the thickness of the ring 160, its width is a function of the width of the slit 150, and its transversal section of the inclination or of the alignment of the substantially axial faces of the ring 160 which form walls of the slit 150. These characteristics are selected according to the preferred leak rate, the dimensions and the form of the sealing joint 40, its compression rate and its hardness.

As indicated in connection with the preceding embodiment, the form of the slot 150, its length and its width, are selected as a function of the dimensions and the hardness of the sealing joint 40 to enable the passage of gas from the gas expansion chamber 20 to the second chamber 24. The depth of the slot 150 is selected according to the preferred leak rate.

In the example of FIG. 10, although the ring 160 has a transversal rectangular section, according to case it can have a transversal square section (i.e. an L-shape) or U-shape, as in the variants of FIGS. 11 and 12, or any other section adapted to the profile of the circumferential cavity 190 of the piston 14. In the example of FIG. 11, a ring 160' fitted with a slit 150', is mounted in a peripheral cavity 190 of the piston 14. As for the ring 160 described previously, it comprises a cylindrical part 161' adapted to be positioned in the bottom of the peripheral cavity 190.

It also comprises an annular part 162' extending radially to the exterior and intended, in the example, to rest against the downstream lateral face of the cavity 190.

A groove 130' is therefore formed, whereof the upstream lateral face is formed by the piston 14, whereof the bottom is formed by the cylindrical part 161' of the ring 160' and whereof the downstream lateral face is formed by the radial part 162' of the ring 160'.

As illustrated in FIG. 11, the slit 150' constitutes a slot formed by a first segment 151' at the bottom of the groove 130' and by a second segment 152' in the downstream lateral wall of the groove 130' (that is, downstream of the joint 40 relative to the gas pressure flow). The slot 150' here fulfils the same function as that of 50', described previously in connection with FIGS. 5 and 6.

According to another embodiment (not shown), the radial part 162' of the ring 160' this times forms the upstream lateral face of the groove 130 such that the slot 150' is positioned upstream of the joint 40 relative to the gas pressure flow.

In the example of FIG. 12, a ring 160", fitted with a slit 150" and having a transversal U-shaped section, is mounted in a circumferential cavity 190 of the piston 14.

The ring 160" comprises a cylindrical part 161" adapted to be positioned in the bottom of the peripheral cavity 190, and a first part 162" extending radially and intended to rest against the downstream lateral face of said cavity 190. It is however differentiated from the ring 160' of the preceding example in that it also comprises a second part extending radially 163", here designed to rest against the upstream lateral face of the cavity 190.

A groove 130" is therefore formed, whereof the bottom is formed by the cylindrical part 161" of the ring 160" and whereof the upstream and downstream lateral faces are formed respectively by the second radial part 163" and the first radial part 162" of the ring 160".

The slit 150" forms a slot comprising a first segment 151" at the bottom of the groove, a second segment 152" formed in the downstream lateral wall of the groove and a third segment 153" formed in the upstream lateral wall of the groove 130".

As in the examples illustrated, the cylindrical part of the split ring preferably has a width substantially equal to that of the peripheral cavity 190 of the piston 14, and, if required, its radial part or its radial parts are of sufficient height to extend from the bottom to the inlet or the outlet of said cavity. However, it is to be noted that the dimensions of the rings 160, 160', 160" described hereinabove by way of example are not limiting, in particular the width of their cylindrical part, or the height of their annular part(s) can be modified.

Figure 13:
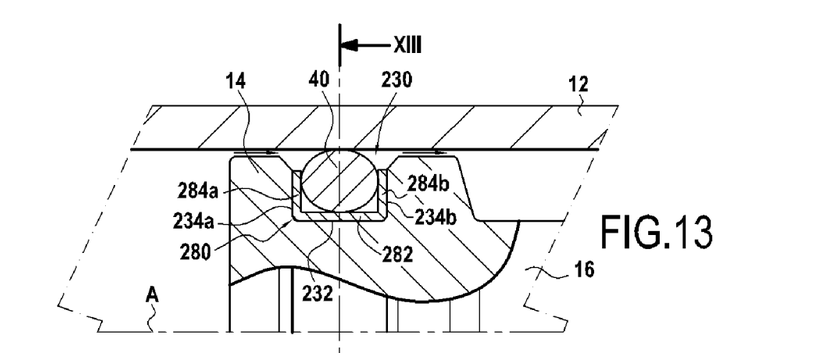
FIGS. 13 to 15 illustrate a third embodiment of the invention.
Figure 14:
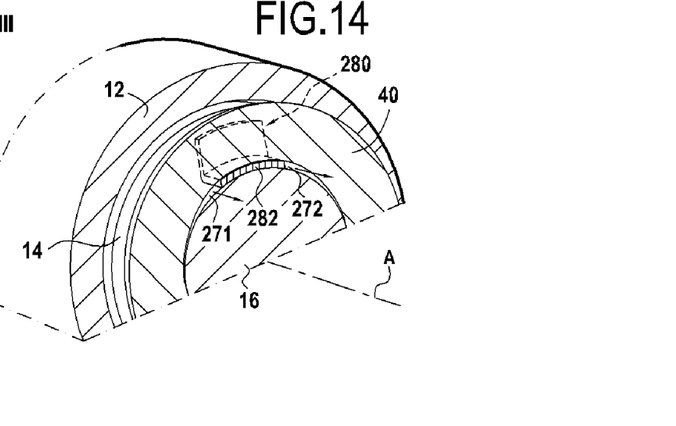
Figure 15:
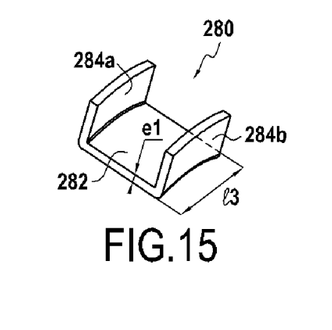

FIGS. 13 to 15 illustrate a third embodiment of the invention. The reference signs corresponding to elements common to those of FIGS. 1 to 12 remain identical for the rest of the description.

According to this third embodiment, and as in the preceding embodiments, a groove 230 formed at the periphery of the piston 14 is intended to receive a sealing joint 40. In the example considered in Figures, the groove 230 has a bottom 232 and two lateral walls 234a and 234b.

As illustrated in FIG. 13, an element is housed inside the groove 230, forming a protruding part 280 which locally decreases the section available for the sealing joint 40 inside this groove.

The dimensions of the attached element, and in particular its width 13 (see FIG. 15), are selected such that the compression rate of the joint 40 is modified locally only.

In the example, the attached element 280 is a strip folded into a U to be adapted to the form of the groove 230 and to be able to be positioned there under the sealing joint 40, such that the base 282 of the U rests against the bottom 232 of the groove 230 and its wings 284a and 284b rest against the upstream 234a and downstream 234b lateral faces of the groove 230.

As illustrated in FIG. 14, the sealing joint 40 is deformed progressively at the level of the attached element 280, and is "lifted" so to speak, locally from the bottom 232 of the groove 230.

A space (respectively 271, 272), forming a calibrated passage for gas, is retained on both sides of the attached element 280, between the sealing joint 40 and the wall of the groove 230.

In the example, where the strip 280 has a U-shape, each passage 271, 272 comprises a first segment in the bottom 232 of the groove 230, a second segment following the downstream lateral face 234b of the groove 230 and a third segment following the upstream lateral face 234a of the groove 230.

It is clearly understood that the gas leak rate between the first and the second chamber of the actuator is inter alia a function of the thickness el of the attached element 280. The thicker the attached element 280, the further the joint 40 is from the bottom or the lateral faces of the groove 230, and the leak orifices 171, 172 for the gas will have a substantial section.

It is to be noted that according to other embodiments the attached element can have a form different to a U. For example, the attached element can have an L-shaped section, or it can comprise a substantially plane portion, intended to be positioned against the wall of bottom of the groove.

To adapt to the curve of the piston 14, the base of the strip 280 is preferably slightly concave, as illustrated in FIG. 14.

The pressure exerted by the O-ring 40 on the strip 280 contributes to keeping the latter in position inside the groove 230. However, it can be advantageous for the strip 280 to be adhesive on the face or all its faces intended to come into contact with the walls of the groove. This ensures its proper positioning inside the groove 230 during assembly and throughout the life of the actuator.

The invention claimed is:

1. A triggered-stroke actuator, comprising:
a body housing a piston and a rod, and
a gas generator mounted in the body opposite the piston and capable of pressurizing a first chamber defined between the gas generator and the piston,
wherein the piston comprises, on its external face, a groove in which a sealing joint with the body is housed, the sealing joint being stationary relative to the piston, the piston further comprising a calibrated passage adapted to evacuate gas from the first chamber formed between the sealing joint and a wall of the groove, the calibrated passage being always open.

2. The actuator according to claim 1, wherein the calibrated passage comprises at least one slot formed in one of the walls of the groove.

3. The actuator according to claim 2, wherein the slot is formed in the piston.

4. The actuator according to claim 1, wherein the groove houses a split ring between the sealing joint and a bottom wall of the groove, the calibrated passage being formed at least in part by a slit of the split ring.

5. The actuator according to claim 2, wherein the groove has a bottom and two lateral walls extending respectively from an inlet of the groove to the bottom and from the bottom to an outlet of the groove and in that the slot comprises a segment formed in the bottom of the groove.

6. The actuator according to claim 5, wherein the slot also comprises a segment formed on at least one of the lateral walls of the groove.

7. The actuator according to claim 2, wherein the slot extends continuously over an entire internal contour of the groove.

8. The actuator according to claim 2, wherein the slot has a transversal section in V-shape.

9. The actuator according to claim 1, wherein the groove houses at least one protruding part resting against a bottom wall of the groove, where at least a portion of the sealing joint rests on top of the at least one protruding part such that the calibrated passage for gas is defined on both sides of the at least one protruding part between the sealing joints first surface of the at least one protruding part, and the bottom wall of the groove, and between the sealing joint, a second surface of the at least one protruding part, and the bottom wall of the groove.

10. The actuator according to claim 9, wherein the protruding part is formed by an attached element in the groove.

11. The actuator according to claim 10, wherein the attached element has a U-shape adapted to a section of the groove.

12. The actuator according to claim 10, wherein the attached element is a metal strip.

13. The actuator according to claim 10, wherein the attached element comprises at least one adhesive portion, by which the attached element can adhere to a wall of the groove.

14. The actuator according to claim 10, wherein a second chamber is defined by an internal surface of the body to a side of the piston opposite the first chamber and at least partially houses the rod, and in that the calibrated passage is configured to let gas escape between the first chamber and the second chamber.

15. The actuator according to claim 14, wherein prior to triggering, the second chamber is initially insulated from the exterior by blocking means in contact with the internal surface of the body and in that the blocking means are supported by the rod such that during operation of the actuator the blocking means are moved into a position in which the second chamber is open to the exterior.

16. The actuator according to claim 1, wherein the gas generator is a pyrotechnic gas generator.

* * * * *